United States Patent
Gautier et al.

[11] Patent Number: 6,067,891
[45] Date of Patent: May 30, 2000

[54] BRAKING ASSISTANCE PNEUMATIC SERVOMOTOR WITH IMPROVED VALVE

[75] Inventors: Jean Pierre Gautier; Ulysse Verbo, both of Aulnay-sous-Bois, France

[73] Assignee: Bosch Systems de Freinage, Drancy, France

[21] Appl. No.: 08/750,644

[22] PCT Filed: Dec. 4, 1996

[86] PCT No.: PCT/FR96/01929

§ 371 Date: Dec. 11, 1996

§ 102(e) Date: Dec. 11, 1996

[87] PCT Pub. No.: WO97/28032

PCT Pub. Date: Aug. 7, 1997

[30] Foreign Application Priority Data

Jan. 30, 1996 [FR] France ................................. 96 01044

[51] Int. Cl.$^7$ .......................... B60T 13/569; B60T 13/57
[52] U.S. Cl. ...................................... 91/376 R; 91/369.2
[58] Field of Search ................................ 91/369.1, 369.2, 91/369.3, 369.4, 376 R

[56] References Cited

U.S. PATENT DOCUMENTS 4,803,912  2/1989  Nishii ..................................... 91/369.2

FOREIGN PATENT DOCUMENTS 2161232  1/1986  United Kingdom .

Primary Examiner—John E. Ryznic
Attorney, Agent, or Firm—Leo H. McCormick, Jr.

[57] ABSTRACT

A pneumatic brake booster for providing braking assistance. The brake booster has an envelope (10) with an axis of symmetry (X-X') separated sealingly by at least one movable partition (12) to define at least a first chamber (14) connected permanently to a source of low pressure and at least a second chamber (16). The second chamber (16) being selectively connected to the first chamber (14) or a source of high pressure through a three way valve structure actuated by a control rod (30). The control rod (30) being capable of bearing, through the intermediary of a front face of a plunger (28) and a reaction disc (50) with a rear face of a thrust rod (48). The plunger (28) sliding in a bore (26) in the movable partition (12). The three way valve further including a valve member (36) disposed in a tubular rear part (22) of the movable partition (12) and co-operating through an annular front face (40) with a first valve seat (28a) formed on the plunger (28) and with a second valve seat (20a,20b) formed on the movable partition (12). The tubular part (22) having a space (35) located between the first (40) and second (20a,20b) valve seats and communicating with at least one radial passage (34) formed in the movable partition (12) which opens out into the second chamber (16). The tubular part (22) has at least one axial passage (37) which opens into the first chamber (14). The annular front face (40) of the valve member is urged in the direction of the first and second valve seats by a valve spring (42). The second valve seat (20,20b) being characterised by a surface formed on the movable partition (12) by bringing together at least two circular arcs (20a,20b) which are concentric, coplanar and of different radii.

4 Claims, 1 Drawing Sheet

BRAKING ASSISTANCE PNEUMATIC SERVOMOTOR WITH IMPROVED VALVE

The present invention relates to pneumatic boosters, or servo actuators, of the kind which are used to provide braking assistance for automobile vehicles.

BACKGROUND OF THE INVENTION

Such boosters are well known in automobile technology and comprise in general an envelope having an axis of symmetry, separated sealingly by at least one movable partition structure into a front chamber connected permanently to a source of low pressure, and a rear chamber connected selectively to the front chamber or to a source of hitch pressure by a three way valve means actuated by a control rod capable of bearing, through the intermediary of the front face of a plunger, on the rear face of a thrust rod which is solid with a reaction disc, the plunger sliding in a bore in the movable partition, the three way valve comprising a valve member disposed in a tubular rear part of the movable partition and co-operating through an annular front face with a first valve seat formed on the plunger and with a second valve seat formed on the movable partition, a space being arranged between the two valve seats and communicating with at least one radial passage formed in the movable partition and opening out into the rear chamber, at least one axial passage being formed in the movable partition and openings into the front chamber, the annular front face of the valve member being urged in the direction of the valve seats by a valve spring.

Very many documents illustrate this type of booster, like for example the document GB-A-2 095 778. For a long time, improvements have been sought in the performance of the boosters, and in particular reductions in the response time, such as to obtain rapid actuation of the brakes when a force is applied to the brake pedal and also the return time, so that the driver will be able to control precisely the amount of his braking action.

Improvement of the response time is obtained by increasing the cross sectional area of the air flow passage at the level of the first annular valve seat, and generally by increasing its diameter. On the other hand, when a reduction in the return time of the booster is sought, this requires a reduction in the diameter of the second annular valve seat. These two improvements are thus in contradiction since in this design of booster, the valve seats are disposed substantially in the same plane and the diameter of the first valve seat is limited by, amongst other parameters, the diameter of the second valve seat.

SUMMARY OF THE INVENTION

The present invention is situated in this context and has as object to provide a booster of the kind referred to above, in which a reduction is obtained both in the response time and the return time, by means which are simple to implement and reliable, and moreover while modifying only a minimum of the components of a conventional booster so as to use a maximum of parts which are already in production and thus avoid increasing the cost of the booster.

To this end, the present invention provides that the second valve seat formed on the movable partition is formed by bringing together at least two circular arcs which are concentric, coplanar and of different radiuses.

Preferably, the second valve seat formed on the movable partition comprises at least a first circular arc substantially in an angular sector where the space communicates directly with the radial passage and at least a second circular arc substantially in an angular sector where the axial passage is formed which opens out into the front chamber.

Advantageously, the radius of the first circular arc is greater than the radius of the second circular arc.

In accordance with an advantageous embodiment the axial passage which opens out into the front chamber is partially formed by an axial groove formed in the rear tubular part of the movable partition.

Other objects, features and advantages of the present invention will appear more clearly from the following description of an embodiment thereof, given by way of illustration, with reference to the accompanying drawings.

DETAILED DESCRIPTION OF THE INVENTION

Figure 1:
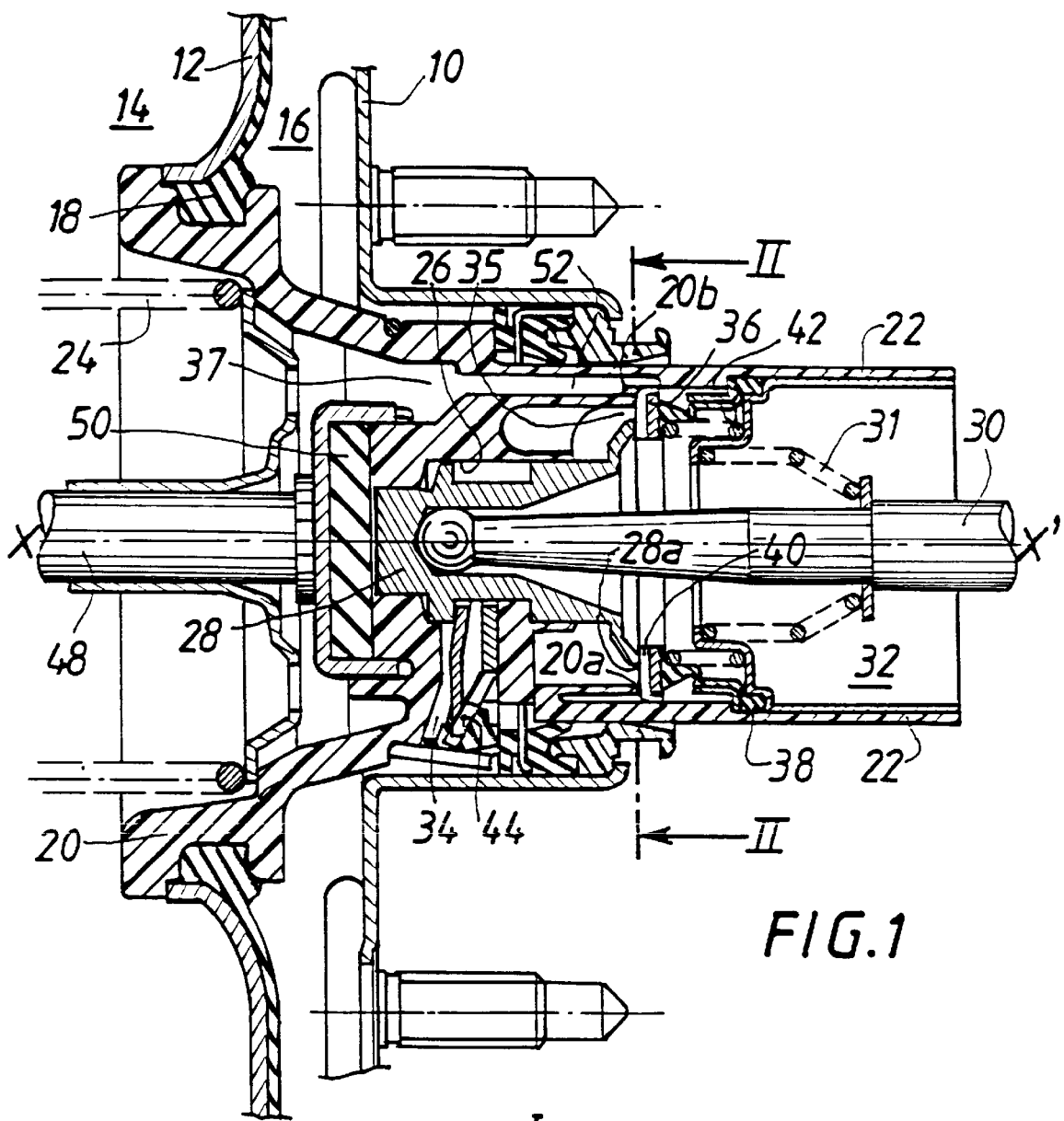
FIG. 1 shows an elevational view in longitudinal section of the rear central part of a pneumatic booster for braking assistance, made in accordance with the present invention.

FIG. 1 shows a sectional view of the rear central part of a pneumatic booster for braking assistance designed to be placed in the conventional manner between the brake pedal of a vehicle and the master cylinder which controls the pressure in the hydraulic braking circuit of this vehicle.

The convention is to call the "front" of the booster that part of it which is facing the master cylinder and the "rear" of the booster that part which is facing the brake pedal. In the drawings, the front is accordingly to the left and the rear to the right.

The booster shown in FIG. 1 comprises an outer envelope 10 in the form of a shell, having rotational symmetry about an axis X-X'. Only the rear central part of this envelope 10 is shown in FIG. 1.

A movable partition structure 12 defines within the envelope 10 a front chamber 14 and a rear chamber 16. The movable partition 12 is associated with a flexible rolling diaphragm of elastomer whose inner peripheral edge is received sealingly by means of a bead 18 in a hollow booster piston 20, which is disposed along the axis X-X' of the booster, the outer peripheral edge (not shown) of the diaphragm being fixed sealingly to the outer envelope 10.

The hollow piston 20 extends rearwards in the form of a tubular part 22 which passes sealingly through the rear wall of the envelope 10. A compression spring 24 interposed between the piston 20 and the front wall (not shown) of the envelope 10 normally maintains the piston 20 in the rest position illustrated in FIG. 1 in which the rear chamber 16 is at its minimum volume and the front chamber 14 at its maximum volume.

In the central part of the movable partition disposed forwards of the rear tubular part 22, the piston 20 has a stepped bore 26 within which is received slidingly a plunger 28. The front end of a control rod 30 of the booster also disposed along the axis X-X' is mounted pivotingly in a blind hole in the plunger 28.

The rear end (not shown) of the control rod 30, which projects out of the tubular part 22, is controlled directly by the brake pedal of the vehicle (not shown), and is urged back towards to its rest position by a return spring 31.

The annular space 32 around the control rod 30 can communicate with the rear chamber 16 through a radial passage 34 formed in the central part of the piston 20, when the boost means controlled by the plunger 28 are actuated.

In a manner which is known, for example from the document referred to above, these boost means comprise a three way valve comprising an annular valve member 36 and two valve seats 20a and 28a formed respectively at the rear of the central part of the piston 20 and at the rear of the plunger 28, the seat 20a surrounding the seat 28a, a space 35 being arranged between these two seats and communicating with the radial passage 34.

The valve member 36 forms the front end, of smaller diameter, of a flexible tubular sleeve of elastomer material whose rear end 38 is fixed sealingly within the tubular part 22, and it presents an annular front face 40 which is movable along the axis X-X', this front face being urged forwards by a valve spring 42 to bring it into separate or combined co-operation with the valve seat 20a and with the valve seat 28a.

In the usual way, according to the position of the plunger 28 within the bore 26, one of the passages of the valve 20a-40 or 28a-40 is opened, either to bring the annular space 32 into communication with the radial passage 34 and the rear chamber 16 during a braking action, or to bring the space 35 into communication with a substantially axial passage 37 formed in the central part of the piston 20 and opening into the front chamber 14 during the return of the booster to the rest position.

Lastly, at least one abutment member 44 mounted in the central part of the piston 20 limits the axial stroke of the plunger 28 within the bore 26. The plunger 28 is normally maintained in its rear rest position defined by the member 44, by means of the return spring 31.

It will be understood therefore, as explained above, that the reduction in the response time of the booster is obtained by an increase in the cross sectional area of the air passage between the annular space 32 and the rear chamber 16, that is to say by increasing the diameter of the valve seat 28a and, if one wishes to avoid the space 35 introducing in turn a restriction on the path of the air towards the rear chamber, this leads to increasing the diameter of the valve seat 20a as well. This latter increase leads in turn to a reduction in the cross sectional area of the axial passage 37, and therefore to a degradation in the return time of the booster.

It will be understood that, conversely, the reduction in the return time of the booster requires an increase in the cross sectional area of the passage 37, and therefore a reduction in the diameter of the valve seat 20a, and consequently a reduction in the diameter of the valve seat 28a, which has the effect of increasing the response time of the booster.

Such a problem is solved in the prior art by trying to find a compromise between the cross sectional areas of the passages 35 and 37 and the diameters of the annular valve seats 20a and 28a.

In accordance with the present invention, this problem is solved by providing a three way valve means enabling the cross sectional areas of the passages to be optimised in order to improve both the response time and the return time.

As shown in the drawings, it is arranged to make the valve seat formed on the piston 20 by bringing together at least two concentric circular arcs 20a and 20b, which are coplanar and of different radiuses.

Figure 2:
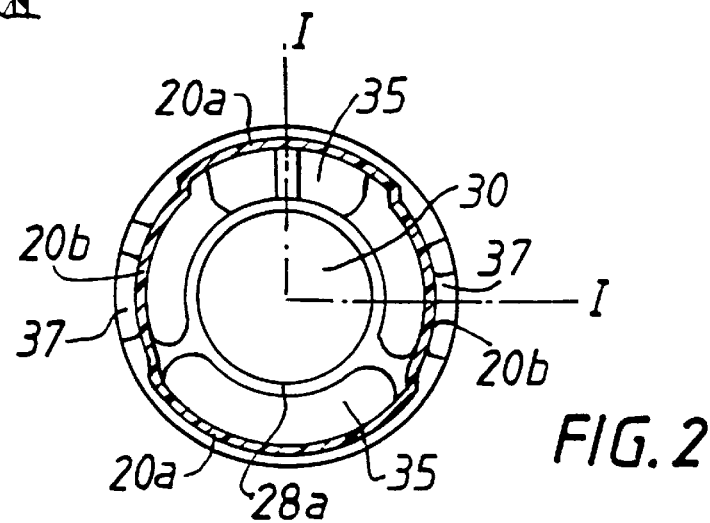
FIG. 2 shows a sectional view taken along, the line II—II of FIG. 1.

More precisely, and as shown more particularly in FIG. 2, in the zone of the piston 20 in which is formed an axial passage 37, the piston 20 is formed with a valve seat 20b, and in the zone of the piston 20 in which is formed a passage 35 communicating with a radial passage 34, the piston 20 is formed with a valve seat 20a, whose radius is greater than that of the valve seat 20b.

When the booster is in its rest position, the rear position of the plunger 28, as defined by the abutment member 44, is such that the valve seat 28a bears against the annular front face 40 of the valve member 36 and keeps the valve member away from the seats 20a and 20b, in such manner that the front and rear chambers 14 and 16 of the booster communicate through the intermediary of the axial passage 37, the valve passage 20b-40, and the passages 35 and 34.

During a braking action, the driver of the vehicle presses on the brake pedal to move the control rod 30 forwards. The plunger 28 slides in the bore 26, so that the annular front face 40 comes into contact with the seats 20a and 20b, thus cutting the front and rear chambers off from each other.

The plunger 28 continues to move forwards in the bore 26, and the valve seat 28a moves away from the annular front face 40, which brings the annular space 32 into communication with the rear chamber 16 through the intermediary of the passages 35 and 34.

Due to the invention, as will be seen in FIG. 2 and in the lower half of FIG. 1, in the angular sector relative to the axis X-X' where the passage 35 communicates directly with the passage 34, the valve seat 20a formed on the piston is sufficiently far away from the axis X-X' for the passage 35 to have a maximum cross sectional area, and therefore for the response time of the booster to be a minimum.

The pressure can thus increase rapidly in the rear chamber 16 of the booster and create a pressure difference across the movable partition 12, generating a boost force which tends to move it forwards, this force beings transmitted to a thrust rod 48 through an annular front face of the piston 20 acting on a reaction disc 50 against a central part of which bears the front face of the plunger 28.

When the driver wishes to reduce the braking action or to terminate it, he releases the force applied to the control rod 30 which, under the effect of the return spring 31, moves back rearwards taking with it the plunger 28.

The valve seat 28a comes firstly into contact with the annular front face 40, thus cutting off the communication between the annular space 32 and the rear chamber 16. Next, the valve seat 28a lifts rearwards the annular front face 40 of the valve seats 20a and 20b, thus putting the front and rear chambers of the booster into communication.

It will be seen here again, in particular in FIG. 2 and in the upper half of FIG. 1, that, due to the invention, in the angular sector relative to the axis X-X' where the passage 37 is formed, the valve seat 20b formed on the piston is sufficiently close to the axis X-X' for the passage 37 to have a maximum cross sectional area, and therefore for the return time of the booster to be a minimum.

In order to improve further the return time of the booster, it will be possible to arrange, as shown in the upper half of FIG. 1, for the axial passage 37 to be partially formed by an axial groove 52 formed within the thickness of the rear tubular part 22 of the piston 20. Such an arrangement enables the diameter of the valve seat 20b to be increased correspondingly without affecting the return time, as a correspondingly increase can then be made in the diameter of the valve seat 28a, which improves the response time.

Hence, it will be seen that a booster has been provided in which the response time and the return time can be influenced independently from each other, and in particular in order to improve both simultaneously. Such a simultaneous improvement is obtained by simple means, since they only concern the valve seat formed on the piston. The pistons of boosters are usually obtained by moulding from thermoplastic material, so that the means for implementing the invention are therefore particularly simple, reliable and inexpensive. Moreover, the other components of the booster such as the outer envelope and the movable partition solid with the piston, can be used for implementing the present invention, which contributes again to reducing the cost of the invention.

It is to be understood that the invention is not limited to the embodiments which have been described but on the contrary is capable of receiving many modifications which will be apparent to a person skilled in the art. In particular, the invention is of course applicable in the same way to boosters of the tandem kind or to add on chambers.

I claim:

1. A pneumatic booster for braking assistance, comprising:

an envelope having an axis of symmetry;

at least one movable partition structure for sealingly separating said envelope into a first chamber connected permanently to a source of low pressure and a second chamber; and three way valve means actuated by a control rod for selectively connecting said second chamber to said first chamber or to a source of high pressure, said control rod being capable of bearing, through the intermediary of a front face of a plunger on the rear face of a thrust rod, said thrust rod being solid with a reaction disc, said plunger sliding in a bore in the movable partition, said three way valve further including a valve member disposed in a tubular rear part of said movable partition and co-operating through an annular front face with a first valve seat formed on said plunger and with a second valve seat formed on said movable partition, said tubular part having a space between said first and second valve seats and communicating with at least one radial passage formed in said movable partition which opens out into said second chamber, said tubular part having at least one axial passage which opens into said first chamber, said the annular front face of said valve member being urged in the direction of said first and second valve seats by a valve spring, said second valve seat being characterised by a surface formed on the movable partition by bringing together at least two circular arcs which are concentric, coplanar and of different radii.

2. The pneumatic booster according to claim 1, characterised in that said second valve seat formed on the movable partition comprises at least a first circular arc substantially in an angular sector where a space communicates directly with said radial passage and at least a second circular arc substantially in an angular sector where said axial passage is formed which opens out into said first chamber.

3. The pneumatic booster according to claim 2, characterised in that a radius of said first circular arc is greater than a radius of said second circular arc.

4. The pneumatic booster according to claim 3, characterised in that said axial passage which opens out into said first chamber is partially formed by an axial groove formed in a rear tubular part of said movable partition.

* * * * *